Sept. 25, 1928.
F. AESCHBACH
DOUGH KNEADING MACHINERY
Filed Jan. 12, 1928
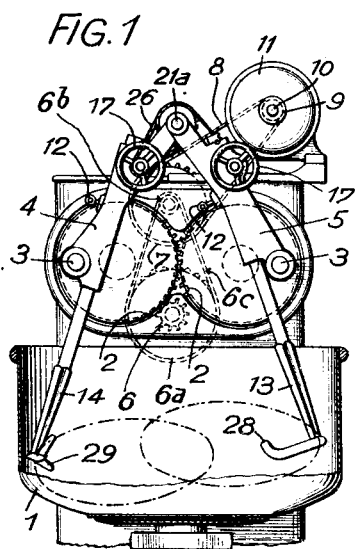
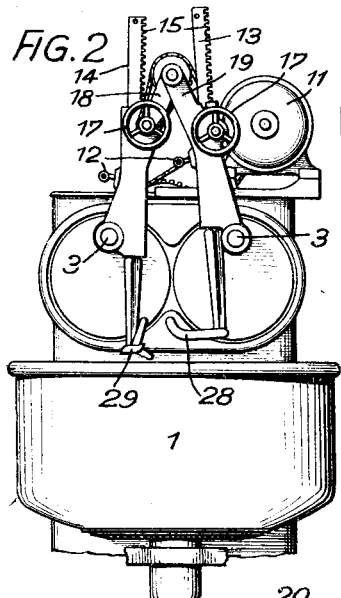
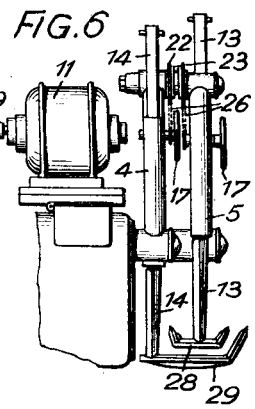
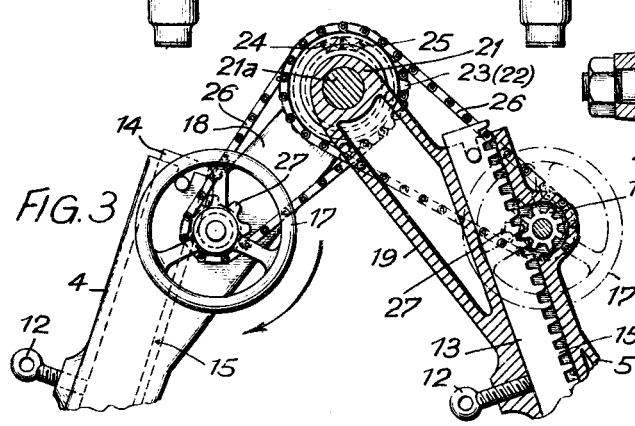
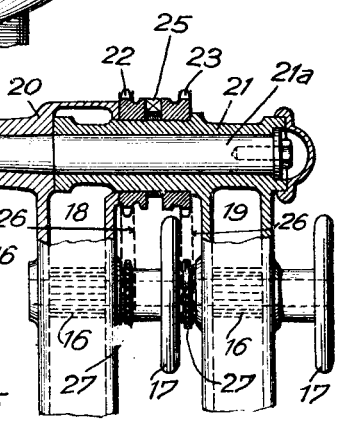
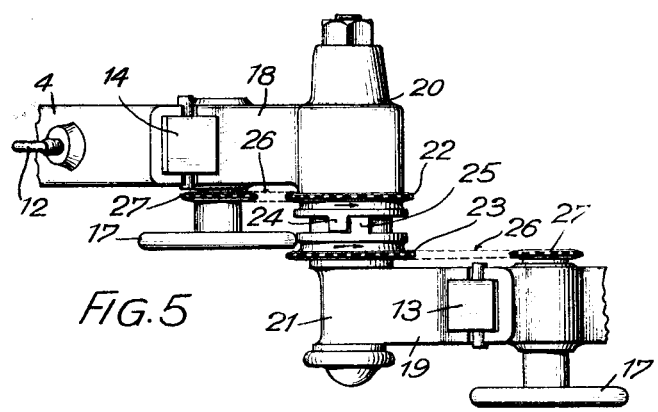
INVENTOR:
Friedrich Aeschbach,
By
Atty.

Patented Sept. 25, 1928.

1,685,185

UNITED STATES PATENT OFFICE.

FRIEDRICH AESCHBACH, OF AARAU, SWITZERLAND.

DOUGH-KNEADING MACHINERY.

Application filed January 12, 1928, Serial No. 246,269, and in Switzerland November 21, 1927.

The present invention refers to kneading machines of the type having a trough, two kneading arms and means to move the arms in elliptical paths so that parts of the two arms pass each other in close proximity in counted directions from time to time to exert a shearing and mixing action on dough in the trough, whilst after the mixing is finished one of said arms is withdrawn from the dough whereby the remaining arm will not shear and mix but draw and lift the dough.

The subject matter of the present invention consists in the provision of means arranged on both arms and adapted to lift said arms without permitting said arms to knock against each other or on each other. Said means being operatively connected with each other in such a manner that when the means on one arm are actuated the other arm is lifted as well, whilst upon actuation of the means on this other arm the first mentioned arm remains in its non-lifted position so that the kneading arms cannot knock against each other.

A constructional example of the subject matter of the present invention is illustrated on the accompanying drawings, in which Fig. 1 is a front elevation of the kneading machine with parts shown in section and the kneading arms in the working position, Fig. 2 is a front elevation with the arms shown in the raised position, Fig. 3 shows on a larger scale partly in elevation and partly in section a detail, Fig. 4 is a side view of Fig. 3 with parts shown in section, Fig. 5 is a plan view of Fig. 3, and Fig. 6 shows in a side view the kneading arms.

Referring now to the drawings, 1 denotes the mixing and kneading trough and 2 are two cooperating spur gear wheels, provided with eccentrically arranged pins 3 which cooperate with the guides 4 and 5 for the kneading arms or kneaders in a manner known per se to cause the elliptic movement of the kneading arms. The gear wheels 2 are driven by means of a pinion 6, chain wheels 6ª and 6ᵇ, chain 6ᶜ, chain wheels 7 and 9 and chain 8, the chain wheel 9 being fixed to the shaft 10 of the electric motor 11. Within the hollow guides 4 and 5 the kneaders 13 and 14 are endwise displaceable and may be fixed in their position by means of the set screws 12. The kneaders 13 and 14 are provided with fingers 28 and 29 (Fig. 6) which intermesh. The stems of the kneaders are provided with teeth 15 and with the thus formed toothed rack of each kneader a pinion 16 meshes which can be turned by a hand wheel 17. The guides 4 and 5 are provided with extensions 18 and 19 having bearings 20 and 21 (Fig. 4) at their ends through which a pin 21ᵃ passes for pivotally connecting the two guides. Two chain wheels 22 and 23 are freely rotatable on the bearing 21 and are prevented from moving axially by shoulders on the bearings 20 and 21 respectively; chains 26 pass over the chain wheels 22 and 23 to chain wheels 27 fixed to the axles of the hand wheels 17. The chain wheel 22 (Fig. 5) is provided with a lateral extension or cam 24 and the chain wheel 23 is provided with a similar cam 25 projecting into the path of the cam 24.

If the hand wheel 17 of the arm 14 is turned in the direction of the arrow indicated in Fig. 3 the chain 26 causes a turning motion of the chain wheel 22 in the direction of the arrow shown in Fig. 5 and the cam 24 causes the cam 25 to take part in the turning movement whereby the chain wheel 23 is turned in the same direction so that both arms 13 and 14 are simultaneously lifted clear of the trough into the position shown in Fig. 2.

In order to obtain a proper kneading action it is necessary that after the dough has been sufficiently sheared nd mixed by the action of both kneading fingers one of said arms be withdrawn and the remaining arm draws and lifts the dough. The remaining arm must be the arm 14 the fingers 29 of which are below the fingers 28 of the arm 13 in order to prevent these fingers knocking against each other as would be the case if the arm 14 were withdrawn. When the hand wheel 17 which belongs to the arm 13 is turned in the clockwise direction the chain 26 turns only the chain wheel 23 in the direction of the arrow shown in Fig. 5. The chain wheel 22 remains stationary as the cam 25 moves away from the cam 24 and is not caused to take part in the turning movement during the first revolution of the chain wheel 23, during which the arm 13 is lifted whilst the arm 14 remains in its lower position to act further on the dough.

If the hand wheel 17 belonging to the arm 14 is turned in the clockwise direction the chain wheel 22 is turned in the direction of the arrow, however the cam 24 cooperates with the cam 25 so that both arms are simultaneously lifted. The lower arm 14 can thus not be lifted first and a collision of the fingers 28 and 29 is avoided, no matter which hand wheel is turned first. This arrangement for lifting the arms is thus fool-proof and effectively prevents damage to the kneading arms when one or both of them are lifted clear of the trough.

I claim:

1. In a dough kneading and mixing machine, in combination, a kneading trough, two kneading arms, a mechanism adapted to impart movement to said arms so that their lower ends move in elliptical paths and pass each other in close proximity in counter directions, means provided with each kneading arm to withdraw it from the trough, and an inter-connection between said lifting means adapted to permit one of said arms to be raised without raising the second arm when one of said means is actuated and to raise both arms when the means of said second arm are actuated to prevent said arms from knocking against each other.

2. In a dough kneading and mixing machine, in combination, a kneading trough, two kneading arms longitudinally displaceable in guides and provided with teeth in the manner of toothed racks, a mechanism adapted to impart movement to said guides and thereby to said arms so that their lower ends move in elliptical paths and pass each other in close proximity in counter directions, two pinions cooperating with the toothed portions of said arms, a hand wheel each for turning said pinions, and an operative connection interposed between said two pinions and permitting to raise one of said arms without raising the other when one hand wheel is turned and to raise both arms when the other hand wheel is turned.

3. In a dough kneading and mixing machine, in combination, a kneading trough, two kneading arms longitudinally displaceable in guides and provided with teeth in the manner of toothed racks, a mechanism adapted to impart movement to said guides and thereby to said arms so that their lower ends move in elliptical paths and pass each other in close proximity in counter directions, two pinions cooperating with the toothed portions of said arms, a hand wheel each for turning said pinions, chain wheels in rigid connection with each hand wheel, two coaxially mounted chain wheels, one of the latter being in operative connection by a chain with the chain wheel belonging to one hand wheel and the other by a chain with the chain wheel belonging to the other hand wheel, and extensions on both of the coaxial chain wheels, said extensions being arranged in the path of each other so that when one of the hand wheels is turned one extension moves away from the other and only one of the kneading arms is raised whilst a turning of the other hand wheel causes the extensions to cooperate and to raise both kneading arms.

In testimony whereof I have signed my name to this specification.

FRIEDRICH AESCHBACH.